United States Patent
Codilian et al.

(10) Patent No.: US 6,892,313 B1
(45) Date of Patent: May 10, 2005

(54) METHOD FOR PREDICTIVE POWER MANAGEMENT FOR OPERATING A DISK DRIVE IN A MOBILE DEVICE TO OPTIMIZE POWER USAGE

(75) Inventors: Raffi Codilian, Irvine, CA (US); Anil Sareen, Mission Viejo, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 706 days.

(21) Appl. No.: 09/887,583

(22) Filed: Jun. 21, 2001

(51) Int. Cl.[7] .................................................. G06F 1/32
(52) U.S. Cl. ...................................... 713/323; 713/320
(58) Field of Search ................................. 713/320, 322, 713/323, 324, 300; 360/69, 73, 75; 365/226, 227, 229

(56) References Cited

U.S. PATENT DOCUMENTS

| | | | | |
|---|---|---|---|---|
| 5,452,277 A | * | 9/1995 | Bajorek et al. | 369/53.18 |
| 5,493,670 A | * | 2/1996 | Douglis et al. | 713/324 |
| 5,682,273 A | * | 10/1997 | Hetzler | 360/75 |
| 5,774,292 A | * | 6/1998 | Georgiou et al. | 359/665 |
| 5,954,820 A | | 9/1999 | Hetzler | |

FOREIGN PATENT DOCUMENTS

WO    WO 01/15161 A1    3/2001

* cited by examiner

*Primary Examiner*—Lynne H. Browne
*Assistant Examiner*—Paul Yanchus, III
(74) *Attorney, Agent, or Firm*—Milad G. Shara, Esq.; Robroy R. Fawcett, Esq.

(57) ABSTRACT

The invention may be embodied in a method for operating a disk drive in a mobile device to optimize power usage. The mobile device may be a hand held computing device such as a personal digital assistant (PDA) or a mobile terminal such as a cellular telephone. Immediately after responding to a disk access command, the disk drive is in first operating mode that consumes a relatively high level of power and may transition to a second operating mode that consumes a relatively low level of power. A transition from the second operating mode to the first operating mode consumes a transition quantity of power. A predictive technique tracks a user's usage pattern and adapts an operating mode transition time based on the usage pattern.

42 Claims, 5 Drawing Sheets

METHOD FOR PREDICTIVE POWER MANAGEMENT FOR OPERATING A DISK DRIVE IN A MOBILE DEVICE TO OPTIMIZE POWER USAGE

BACKGROUND OF THE INVENTION

1. Field of the Invention

The present invention relates to digital data storage, and more particularly, to operation of a hard disk drive in a mobile device to optimize power usage.

2. Description of the Prior Art

A handheld mobile device has limited battery capacity and power consumption of each component within the device may be of critical concern. A hard disk drive provides digital data storage on a magnetic media of a rotating disk. A spindle motor rotates the disk at a predetermined rate during access to the disk. The power consumption of the spindle motor may be reduced by "spinning down" the disk between disk accesses thus allowing removal of a power consuming control current to the spindle motor. However, spinning down the disk affects the response time of the disk drive to disk commands and may involve a power consumption penalty associated with "spinning up" the disk drive.

Accordingly, there exists a need for a technique for operating a disk drive in a mobile device to optimize power usage. The present invention satisfies these needs.

SUMMARY OF THE INVENTION

The present invention may be embodied in a mobile device having a disk drive, and a method for operating the disk drive in the mobile device to optimize power usage. Immediately after responding to a disk access command from the mobile device, the disk drive is in a first operating mode that consumes a relatively high level of power and may transition to a second operating mode that consumes a relatively low level of power. In the method, a first time period threshold and a second time period threshold may be set with the first time period threshold being less than the second time period threshold. An adjustable delay time interval may be set to correspond to one of the time period thresholds. The delay time interval is a time interval for waiting after an end of a response to a disk access command before transitioning from the first operating mode to the second operating mode. The disk drive measures a demand time interval for each of a plurality of disk access commands. Each demand time interval may be defined as a time period between an end of a response to a last disk access command and an arrival of a next disk access command. If a majority of a predetermined number of the plurality of demand time intervals falls within a time period less than the first time period threshold or a time period greater than the second time period threshold, then the delay time interval may be set to be equal to about the first time period threshold. If a majority of a predetermined number of the plurality of demand time intervals falls within a time period between the first time period threshold and the second time period threshold, the delay time interval may be set to be equal to about the second time period threshold. The disk drive may transition from the first operating mode to the second operating mode after expiration of the delay time interval.

In more detailed features of the invention, transitioning from the second operating mode to the first operating mode may consume a transition quantity of power, and an exchange time interval may be defined as a time period during which power consumed by operating in the first power operating mode is about equal to the transition quantity of power. The predetermined number of the plurality of demand time intervals may be 7 and the majority for setting the delay time interval may be 4. Also, the delay time intervals comprising the predetermined number may be measured using the most recent disk access commands.

In another embodiment of the invention, a third time period threshold may be set that is greater than the second time period threshold and less than the exchange time interval. If a majority of the predetermined number of the plurality of demand time intervals falls within a time period less than the first time period threshold or a time period greater than the third time period threshold, then the delay time interval may be set to be equal to about the first time period threshold. If a majority of the predetermined number of the plurality of demand time intervals falls within a time period between the first time period threshold and the second time period threshold, the delay time interval may be set to be equal to about the second time period threshold. If a majority of the predetermined number of the plurality of demand time intervals falls within a time period between the second time period threshold and the third time period threshold, then the delay time interval may be set to be equal to about the third time period threshold. The first time period threshold may be about 0.3% of the exchange time interval, the second time period threshold may be about 33% of the exchange time period, and the third time period threshold may be about 66% of the exchange time interval.

BRIEF DESCRIPTION OF THE DRAWINGS

The accompanying drawings illustrate embodiments of the present invention and, together with the description, serve to explain the principles of the invention.

DETAILED DESCRIPTION

Figure 1:
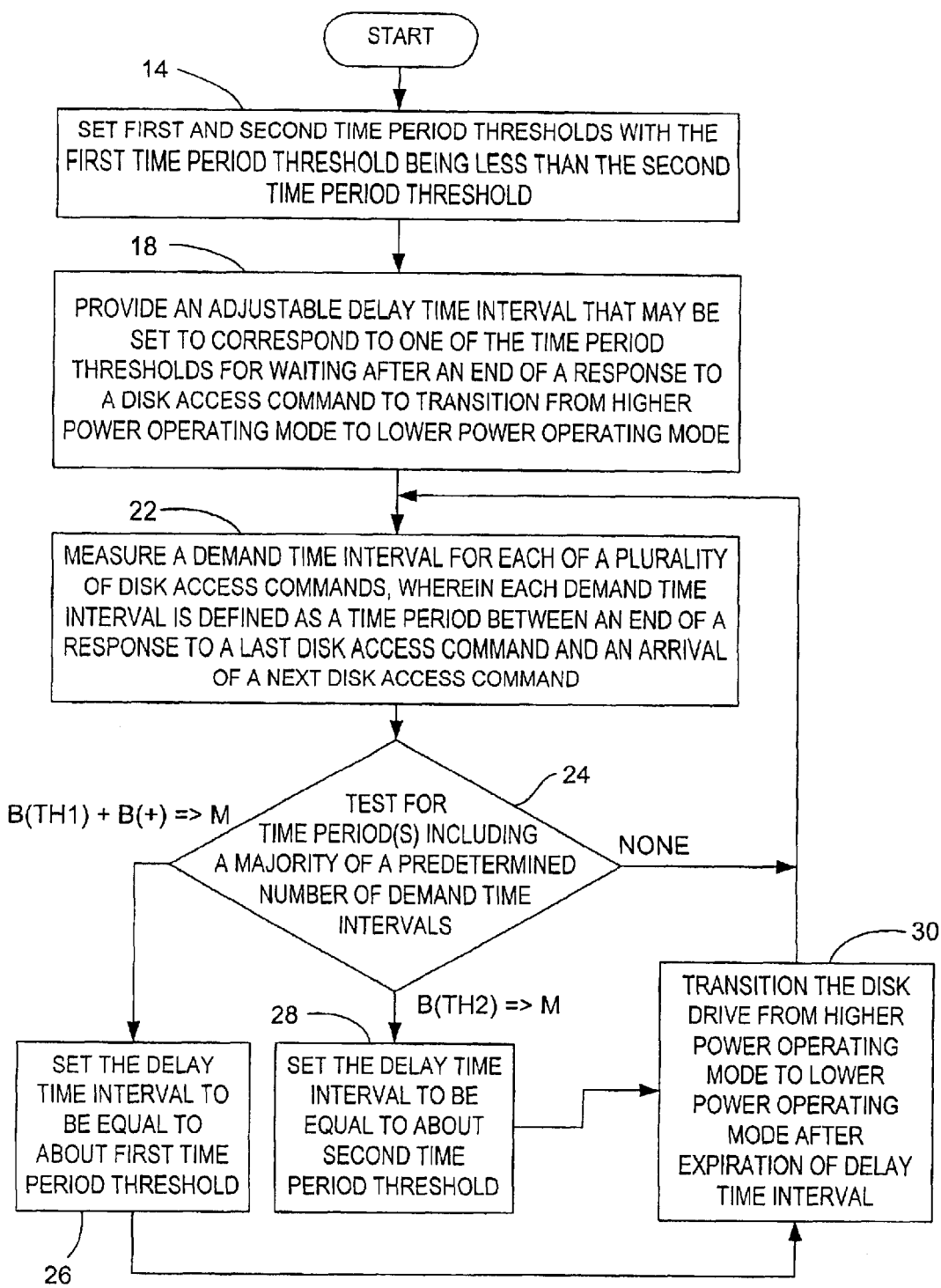
FIG. 1 is a flow diagram of a method for operating a disk drive in a mobile device for optimizing power usage using predictive power management, according to the present invention.
Figure 2:
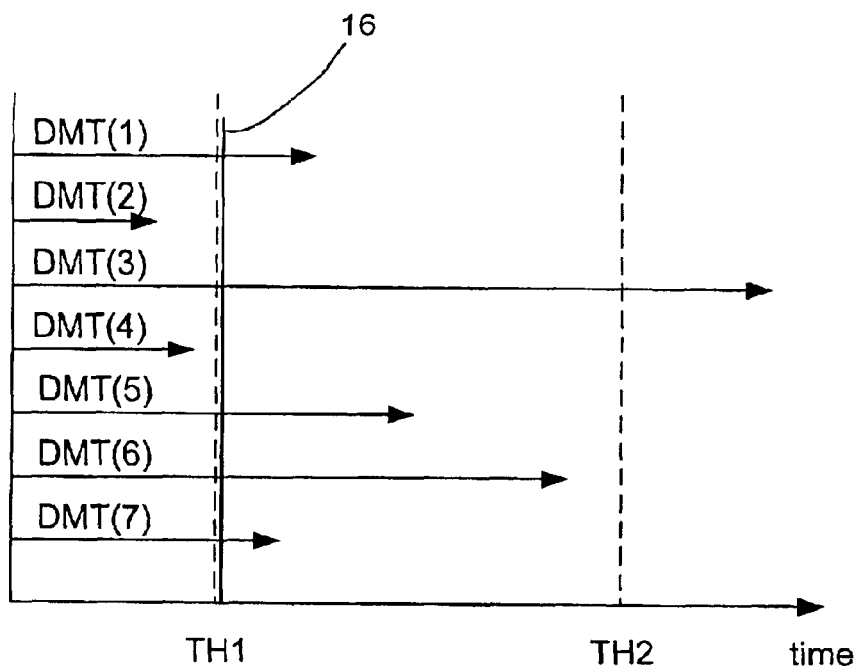
FIG. 2 is a timing diagram of demand time intervals with respect to two time period thresholds and an adjustable delay time interval, according to the present invention.
Figure 3:
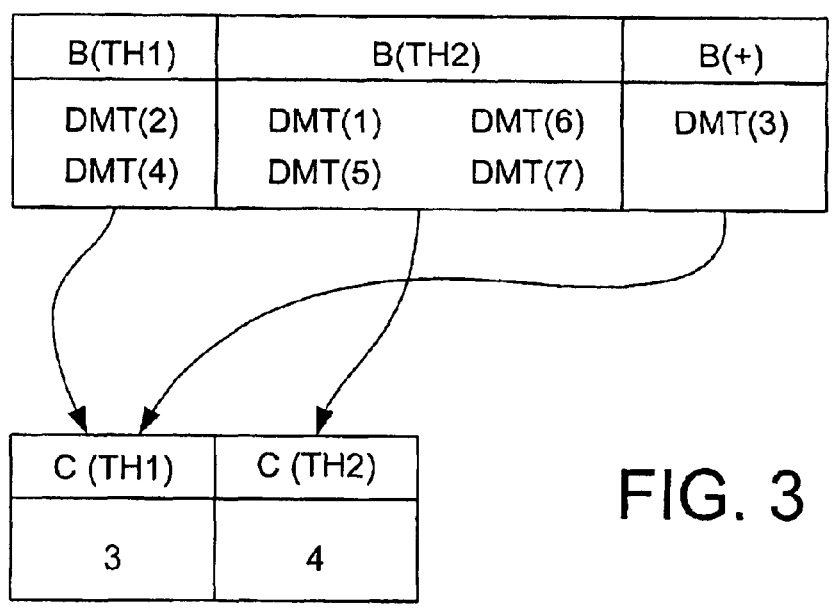
FIG. 3 is a schematic diagram of a data structure having three bins for binning and counting occurrences of demand time intervals, according to the present invention.

With reference to FIGS. 1–4, the present invention may be embodied in a method for operating a disk drive 10 in a mobile device 12 to optimize power usage. The mobile device may be a hand held computing device such as a personal digital assistant (PDA) or a mobile terminal such as a cellular telephone. Immediately after responding to a disk access command, the disk drive is in a first operating mode that consumes a relatively high level of power and may transition to a second operation mode that consumes a relatively low level of power. A transition from the second operating mode to the first operating mode consumes a transition quantity of power. A predictive technique of the invention tracks a user's usage pattern and adapts an operating mode transition time based on the usage pattern.

In the method, a first time period threshold TH1 and a second time period threshold TH2 are set (step 14). The first time period threshold is less than the second time period threshold. An adjustable delay time interval 16 is provided that may be set to correspond to one of the time period thresholds (step 18). The delay time interval is a time interval for waiting after an end of a response to a disk access command before transitioning from the first operating mode to the second operating mode. To set the adjustable delay time period, the disk drive services disk access commands and measures a demand time interval DMT(1–7) for each of a plurality of disk access commands (step 22). Each demand time interval is defined as a time period between an end of a response to a last disk access command and an arrival of a next disk access command of the predetermined number of disk access commands. If a majority of a predetermined number of the plurality of demand time intervals falls within a time period less than the first time period threshold or a time period greater than the second time period threshold (step 24), then the delay time interval is set to be equal to about the first time period threshold (step 26). However, if a majority of a predetermined number of the plurality of demand time intervals falls within a time period between the first time period threshold and the second time period threshold (step 24), the delay time interval is set to be equal to about the second time period threshold (step 28). The disk drive transitions from the first operating mode to the second operating mode after expiration of the newly set delay time interval (step 30) to optimize the disk drive's power usage. After another disk access command is received, a demand time interval is measured (step 22) and the delay time interval setting process repeats.

The time period less than the first time period threshold TH1 is associated with a first bin B(TH1). The time period between the first time period threshold TH1 and the second time period threshold TH2 is associated with a second bin B(TH2). The time period greater than the second time period threshold TH2 is associated with a third bin B(+). The occurrences of the plurality of demand time intervals DMT(N) are recorded in the respective bins as counts. Counts from the first and third bins are combined into a first count C(TH1) associated with setting the delay time interval 16 to be equal to about the first time period threshold. Counts from the second bin are recorded in a second count C(TH2) associated with setting the delay time interval to be equal to about the second time period threshold.

The delay time interval 16 is set based on a count having a majority, e.g., 4 counts of 7 samples, N. As an example, if the delay time interval is currently set to be equal to about the first time period threshold TH1, and the measured demand time interval occurrences are recorded in the second count C(TH2), then a majority of the delay time interval is set to be equal to about the second time period threshold TH1. The delay time interval will be set back to be equal to about the second time threshold when a majority of demand time interval occurrences are recorded in the first count C(TH1).

Accordingly, recent past disk access patterns are used to predict future access patterns and to manage and optimize the disk drive's power usage. The improved predictive power management and usage techniques of the invention may extend the battery's power delivery time thus providing longer operation of the mobile device between battery recharge operations.

Figure 4:
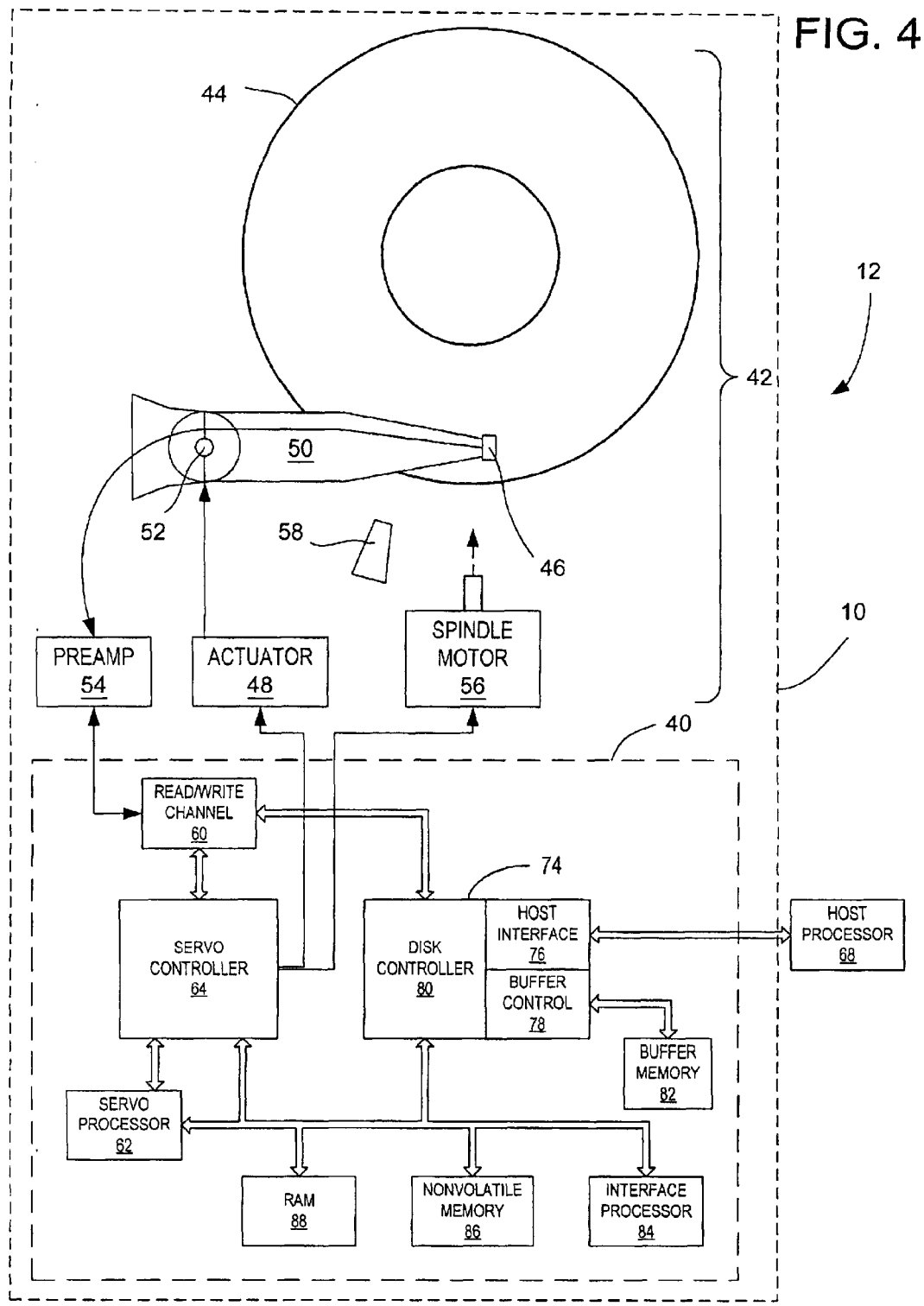
FIG. 4 is a block diagram showing a mobile device having a disk drive for implementing the method of FIG. 1.

With reference to FIG. 4, the disk drive 10 includes a disk control system 40 and a head disk assembly (HDA) 42. The HDA includes a magnetic disk 44 having a disk media with plurality of concentric tracks recorded thereon, a head 46 for writing user data to or reading user data from a selected one of the tracks in response to a host command during operation of the disk drive, and an actuator 48 for positioning the head over the selected track. The head in present disk drives is a giant magneto-resistive (GMR) read element and a thin film inductive write element. The actuator is typically implemented as a voice coil motor (VCM) which rotates the actuator arm 50 about a pivot 52 in order to position the head radially over the disk in response to control signals from the disk control system. The HDA includes a preamplifier 54, a spindle motor 56 for rotating the disk, and a ramp 58 for parking the actuator arm and head when the disk drive is in a spin-down mode. The head communicates with the disk control system via the preamplifier. The preamplifier provides an amplified signal to a read/write channel 60 of disk control system.

The disk control system 40 implements a servo control loop which causes the head 46 to follow a centerline of a selected track in an operation generally referred to as "track following." A servo processor 62 commands a servo controller 64 to control the position of the head over a target track for subsequent execution of read or write commands. The servo processor receives a representative form of a position signal sensed by the head, via the preamplifier 54 and the read/write channel 60, and performs calculations to calculate a position error signal. The servo controller responds to digital commands from the servo processor responsive to the position error signal to provide a corresponding analog signal to the VCM. The servo processor also provides commands to the servo controller to maintain a substantially constant operational rotational velocity of the spindle motor 56.

The disk control system 40 also includes circuitry and processors that provide an intelligent disk control system interface between a host processor 68 of the mobile device 12 and the HDA 42 for execution of read and write commands. The disk control system includes an integrated circuit host interface and disk controller (HIDC) 74 having a host interface 76, a buffer controller 78 and a disk controller 80. The host interface 76 communicates with the host processor. The buffer controller controls a buffer memory 82 employed for storing data from the host processor that is to be written to the disk 44 and for storing data read from the disk. The disk controller sends data to and receives data from the read/write channel 60 and provides for error correction and error detection on data read from the disk. An interface processor 84 handles the flow of data commands received by the host interface by sending commands to and reading status from the disk controller. The interface processor and the servo processor 62 may be advantageously implemented using a single processor of sufficient processing power. Information may be stored in nonvolatile memory 86 or in random access memory (RAM) 88 such as dynamic RAM (DRAM).

The method steps (FIG. 1) of the invention may be implemented by the interface processor 84 and the HIDC 74. Program code for the steps may be stored in the nonvolatile memory 86 and transferred to the RAM 88 during operation for execution by the interface processor.

Figure 5:
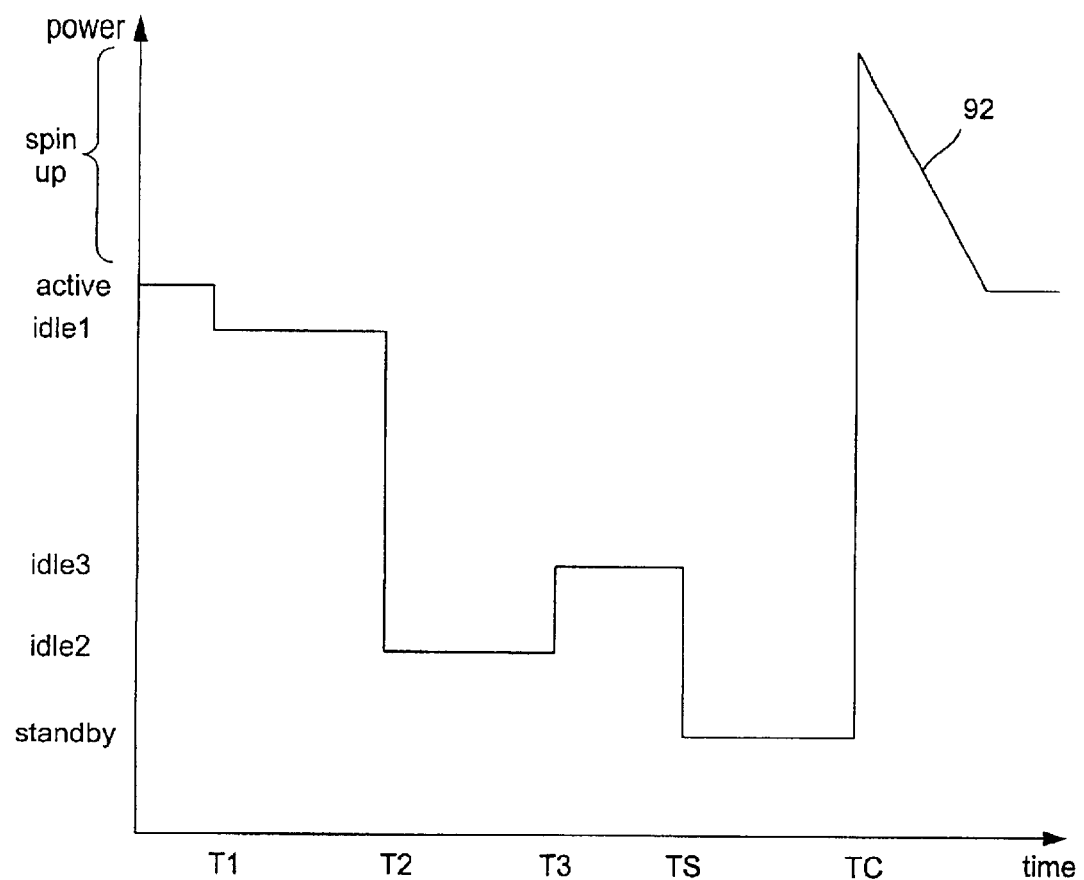
FIG. 5 is a graph diagram showing power consumption associated with power operating modes of the disk drive of FIG. 4.

With reference to FIG. 5, the disk drive 10 has several power states or modes based on usage patterns. The power states are active, idle1, idle2, idle3, and standby. In the active state, all of the disk drive's electronic components are at full power, the disk 44 is spinning at its standard rate, the actuator arm 50 is over the disk media of the disk, and a seek, read or write operation is in progress. In the idle1 state, the disk is spinning at its standard rate, the actuator arm is over the disk media, and the read/write channel 60 is turned off between servo samples. In the idle2 state, the spindle motor 56 is turned off, the disk is not spinning, the actuator arm is parked on the ramp 58 and latched, and the read/write channel and the servo controller 64 are in a low power mode. In the idle3 state, the disk is spinning at a fraction of its standard active state rate, the actuator arm is parked and latched, and the read/write channel and the servo controller are in a low power mode. The idle3 state may be an alternative or precursor to the idle2 state. In the standby state, the spindle motor is turned off and the disk is not spinning, the actuator is parked and latched, the read/write channel and the servo controller are in a low power mode, and clock signals to the microprocessors are inhibited. The DRAM is still active in the standby state.

Continuous operation of the spindle motor 56 in the idle 1 state consumes battery power from the mobile device. Advantageously, during a period of low disk activity, the disk drive 10 is transitioned to the idle2 state. The transition to the idle2 state includes removing a motor drive current from the spindle motor 56 in an operation generally referred to as "spinning down" the disk 44. Returning the disk drive to the active or the idle1 states involves returning the disk to its standard active state rate in an operation generally referred to as "spinning up" the disk. Spinning up the disk consumes battery power at an increased rate until a steady state rotational rate is obtained. This transitional quantity of power 92 is an inherent power penalty associated with spinning down and then spinning up the disk. Accordingly, unnecessarily spinning down the disk may consume more battery power than maintaining the disk drive in the idle1 state. Efficient battery power management requires a balance between keeping the disk drive in a lower power mode versus transitioning it back to a higher power mode to service a disk access.

Figure 6:
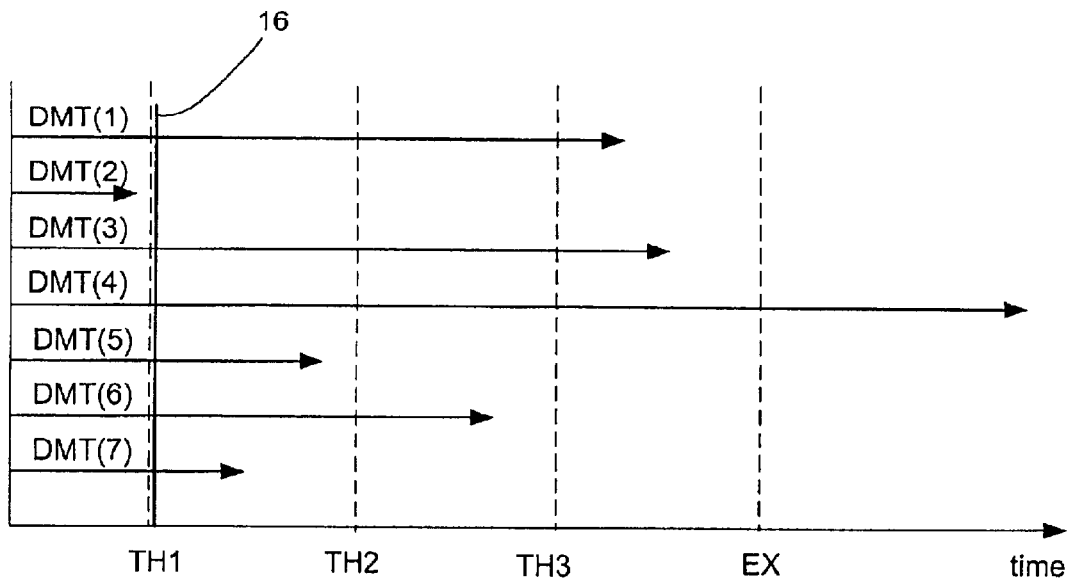
FIG. 6 is a timing diagram of demand time intervals with respect to three time period thresholds and an adjustable delay time interval, according to the present invention.
Figure 7:
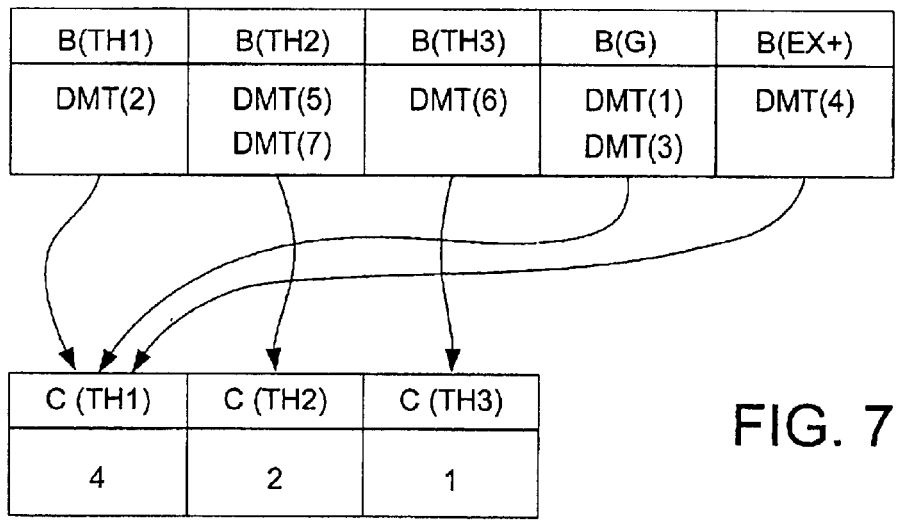
FIG. 7 is a schematic diagram of a data structure having five bins for binning and counting occurrences of demand time intervals, according to the present invention.

With reference to FIGS. 6 and 7, an exchange rate interval EX is defined as a time interval during which the energy that may be consumed by disk drive 10 in the idle1 power state is about equal to the energy consumed to transition the disk drive from the idle2 state to the idle1 state. An exemplary exchange rate interval for a disk drive for use in a mobile device may be about 3 seconds. The present invention may be embodied in a method to optimize power usage using three time thresholds. In this example, the first threshold TH1 may be 10 milliseconds, the second threshold TH2 may be 1 second, and the third threshold TH3 may be 2 seconds. The demand time intervals may be tracked by binning the measured demand time intervals into time periods between the thresholds. A first bin B(TH1) may be associated with a time period falling between 0 and 10 milliseconds. A second bin B(TH2) may be associated with a time period falling between 10 milliseconds and 1 second. A third bin B(TH3) may be associated with a time period falling between 1 second and 2 seconds. A fourth bin B(G), for a grey interval, may be associated with a time period between the third threshold TH3, e.g. 2 seconds, and the exchange rate interval EX, e.g., 3 seconds. The grey interval is close to the exchange rate interval and the potential power savings benefits are relatively small if disk access commands are arriving in this interval. However, the risk of wasting energy by staying in the idle1 state to service disk access commands arriving in the grey interval is considerable. For example, if the disk drive is transitioned from the idle 1 state to idle2 state about 3 seconds after servicing a host command, and a subsequent host command is received after 3.5 seconds, then the 3 second of operation in the idle 1 mode is wasted. Battery power may have been used more effectively if the disk drive was transitioned to the idle2 state after 10 milliseconds. However, if the disk drive is scheduled for transition from the idle 1 state to the idle2 state after about 3 seconds after servicing a host command, and a subsequent command is received after 2.7 seconds, then the power benefit is related to 0.3 second of operation. Accordingly, the cost (3 seconds) is much greater than the benefit (0.3 seconds). A fifth bin B(EX+), for a dark interval, may be associated with demand time period greater than the exchange rate interval EX.

In another exemplary embodiment assuming a 3 second exchange rate interval and employing only two thresholds, the first threshold may be 10 milliseconds and the second threshold may be 2 seconds.

Counts from the first bin B(TH1), the fourth bin B(G), and the fifth bin B(EX+) may be combined into a first count C(TH1) associated with setting the delay time interval 16 to be equal to about the first period threshold TH1. Counts from the second bin B(TH2) may be recorded in a second count C(TH2) associated with setting the delay time interval to be equal to about the second time period threshold TH2. Counts from the third bin B(TH3) may be recorded in a third count C(TH3) associated with setting the delay time interval to be equal to about the third time period threshold TH3.

The delay time interval 16 is set based on the count having a majority. In FIG. 7, the first count C(TH1) has a majority (4 counts out of 7 samples N). Accordingly, the delay time interval is set to be equal to about the first time interval threshold TH1. If no count has a majority, then the delay time interval remains at its current setting. For example, for a sample size of 7 and a majority limit of 4, if the first count C(TH1) is 3, the second count C(TH2) is 2, and the third count C(TH3) is 2, then none of the counts reaches the majority limit and the delay time interval remains unchanged.

Other majority limits and sample sizes may be used such as 5 counts out of 8 samples, 6 counts out of 8 samples, 5 counts out of 9 samples, 6 counts out of 11 samples, etc. Preferably, the sample size is an odd number and is based on the most recent disk access commands.

We claim:

1. A method for operating a disk drive in a mobile device wherein, immediately after responding to a disk access command, the disk drive is in a first operating mode that consumes a relatively high level of power and may transition to a second operating mode that consumes a relatively low level of power, the method comprising the steps of:

setting first and second time period thresholds, the first time period threshold being less than the second time period threshold;

providing an adjustable delay time interval that is set to correspond to one of the time period thresholds, the delay time interval being the time interval for waiting after an end of a response to a disk access command before transitioning from the first operating mode to the second operating mode;

measuring a demand time interval for each of a plurality of disk access commands, wherein each demand time interval is defined as a time period between an end of a response to a last disk access command and an arrival of a next disk access command;

setting the delay time interval to be equal to about the first time period threshold if a majority of a predetermined number of the plurality of demand time intervals falls within a time period less than the first time period threshold or a time period greater than the second time period threshold;

setting the delay time interval to be equal to about the second time period threshold if a majority of a predetermined number of the plurality of demand time intervals falls within a time period between the first time period threshold and the second time period threshold; and transitioning the disk drive from the first operating mode to the second operating mode after expiration of the delay time interval.

2. A method for operating a disk drive as defined in claim 1, wherein transitioning from the second operating mode to the first operating mode consumes a transition quantity of power, and an exchange time interval is defined as a time period during which power consumed by operating in the first power operating mode is about equal to the transition quantity of power.

3. A method for operating a disk drive as defined in claim 2, wherein the second time period threshold is less than the exchange time interval.

4. A method for operating a disk drive as defined in claim 1, wherein the majority for setting the demand time interval to be equal to about the first time period threshold includes at least one demand time interval that falls within the time period greater than the second time period threshold.

5. A method for operating a disk drive as defined in claim 1, wherein the demand time intervals comprising the predetermined number of the plurality of demand time intervals are measured using the most recent disk access commands.

6. A method for operating a disk drive in a mobile device wherein, immediately after responding to a disk access command, the disk drive is in a first operating mode that consumes a relatively high level of power and may transition to a second operating mode that consumes a relatively low level of power, wherein transitioning from the second operating mode to the first operating mode consumes a transition quantity of power, and an exchange time interval is defined as a time period during which power consumed by operating in the first power operating mode is about equal to the transition quantity of power, the method comprising the steps of:

setting first and second time period thresholds, the first time period threshold being less than the second time period threshold, wherein the first time period threshold is about 0.3% of the exchange time interval, and the second time period threshold is about 66% of the exchange time interval;

providing an adjustable delay time interval that is set to correspond to one of the time period thresholds, the delay time interval being the time interval for waiting after an end of a response to a disk access command before transitioning from the first operating mode to the second operating mode;

measuring a demand time interval for each of a plurality of disk access commands, wherein each demand time interval is defined as a time period between an end of a response to a last disk access command and an arrival of a next disk access command;

setting the delay time interval to be equal to about the first time period threshold if a majority of a predetermined number of the plurality of demand time intervals falls within a time period less than the first time period threshold or a time period greater than the second time period threshold;

setting the delay time interval to be equal to about the second time period threshold if a majority of a predetermined number of the plurality of demand time intervals falls within a time period between the first time period threshold and the second time period threshold; and transitioning the disk drive from the first operating mode to the second operating mode after expiration of the delay time interval.

7. A method for operating a disk drive in a mobile device wherein, immediately after responding to a disk access command, the disk drive is in a first operating mode that consumes a relatively high level of power and may transition to a second operating mode that consumes a relatively low level of power, the method comprising the steps of:

setting first and second time period thresholds, the first time period threshold being less than the second time period threshold;

providing an adjustable delay time interval that is set to correspond to one of the time period thresholds, the delay time interval being the time interval for waiting after an end of a response to a disk access command before transitioning from the first operating mode to the second operating mode;

measuring a demand time interval for each of a plurality of disk access commands, wherein each demand time interval is defined as a time period between an end of a response to a last disk access command and an arrival of a next disk access command;

setting the delay time interval to be equal to about the first time period threshold if 4 of 7 of the plurality of demand time intervals falls within a time period less than the first time period threshold or a time period greater than the second time period threshold;

setting the delay time interval to be equal to about the second time period threshold if 4 of 7 of the plurality of demand time intervals falls within a time period between the first time period threshold and the second time period threshold; and transitioning the disk drive from the first operating mode to the second operating mode after expiration of the delay time interval.

8. A method for operating a disk drive in a mobile device wherein, immediately after responding to a disk access command, the disk drive is in first operating mode that consumes a relatively high level of power and may transition to a second operating mode that consumes a relatively low level of power, the method comprising the steps of:

setting first, second and third time period thresholds, the first time period threshold being less than the second time period threshold and the second time period threshold being less than the third time period threshold;

providing an adjustable delay time interval that is set to correspond to one of the time period thresholds, the delay time interval being the time interval for waiting after an end of a response to a disk access command before transitioning from the first operating mode to the second operating mode;

measuring a demand time interval for each of a plurality of disk access commands, wherein each demand time interval is defined as a time period between an end of a response to a last disk access command and an arrival of a next disk access command;

setting the delay time interval to be equal to about the first time period threshold if a majority of a predetermined number of the plurality of demand time intervals falls within a time period less than the first time period threshold or a time period greater than the third time period threshold;

setting the delay time interval to be equal to about the second time period threshold if a majority of a predetermined number of the plurality of demand time intervals falls within a time period between the first time period threshold and the second time period threshold;

setting the delay time interval to be equal to about the third time period threshold if a majority of a predetermined number of the plurality of demand time intervals falls within a time period between the second time period threshold and the third time period threshold; and transitioning the disk drive from the first operating mode to the second operating mode after expiration of the delay time interval.

9. A method for operating a disk drive as defined in claim 8, wherein transitioning from the second operating mode to the first operating mode consumes a transition quantity of power, and an exchange time interval is defined as a time period during which power consumed by operating in the first power operating mode is about equal to the transition quantity of power.

10. A method for operating a disk drive as defined in claim 9, wherein the third time period threshold is less than the exchange time interval.

11. A method for operating a disk drive as defined in claim 8, wherein the demand time intervals comprising the predetermined number of the plurality of demand time intervals are measured using the most recent disk access commands.

12. A method for operating a disk drive as defined in claim 8, wherein the majority for setting the demand time interval to be equal to about the first time period threshold includes at least one demand time interval that falls within the time period greater than the third time period threshold.

13. A method for operating a disk drive in a mobile device wherein, immediately after responding to a disk access command, the disk drive is in first operating mode that consumes a relatively high level of power and may transition to a second operating mode that consumes a relatively low level of power, wherein transitioning from the second operating mode to the first operating mode consumes a transition quantity of power, and an exchange time interval is defined as a time period during which power consumed by operating in the first power operating mode is about equal to the transition quantity of power, the method comprising the steps of:

setting first, second and third time period thresholds, the first time period threshold being less than the second time period threshold and the second time period threshold being less than the third time period threshold, wherein the first time period threshold is about 0.3% of the exchange time interval, the second time period threshold is about 33% of the exchange time period, and the third time period threshold is about 66% of the exchange time interval;

providing an adjustable delay time interval that is set to correspond to one of the time period thresholds, the delay time interval being the time interval for waiting after an end of a response to a disk access command before transitioning from the first operating mode to the second operating mode;

measuring a demand time interval for each of a plurality of disk access commands, wherein each demand time interval is defined as a time period between an end of a response to a last disk access command and an arrival of a next disk access command;

setting the delay time interval to be equal to about the first time period threshold if a majority of a predetermined number of the plurality of demand time intervals falls within a time period less than the first time period threshold or a time period greater than the third time period threshold;

setting the delay time interval to be equal to about the second time period threshold if a majority of a predetermined number of the plurality of demand time intervals falls within a time period between the first time period threshold and the second time period threshold;

setting the delay time interval to be equal to about the third time period threshold if a majority of a predetermined number of the plurality of demand time intervals falls within a time period between the second time period threshold and the third time period threshold; and transitioning the disk drive from the first operating mode to the second operating mode after expiration of the delay time interval.

14. A method for operating a disk drive in a mobile device wherein, immediately after responding to a disk access command, the disk drive is in first operating mode that consumes a relatively high level of power and may transition to a second operating mode that consumes a relatively low level of power, the method comprising the steps of:

setting first, second and third time period thresholds, the first time period threshold being less than the second time period threshold and the second time period threshold being less than the third time period threshold;

providing an adjustable delay time interval that is set to correspond to one of the time period thresholds, the delay time interval being the time interval for waiting after an end of a response to a disk access command before transitioning from the first operating mode to the second operating mode;

measuring a demand time interval for each of a plurality of disk access commands, wherein each demand time interval is defined as a time period between an end of a response to a last disk access command and an arrival of a next disk access command;

setting the delay time interval to be equal to about the first time period threshold if 4 of 7 of the plurality of demand time intervals falls within a time period less than the first time period threshold or a time period greater than the third time period threshold;

setting the delay time interval to be equal to about the second time period threshold if 4 of 7 of the plurality of demand time intervals falls within a time period between the first time period threshold and the second time period threshold;

setting the delay time interval to be equal to about the third time period threshold if 4 of 7 of the plurality of demand time intervals falls within a time period between the second time period threshold and the third time period threshold; and transitioning the disk drive from the first operating mode to the second operating mode after expiration of the delay time interval.

15. A mobile device having a disk drive wherein, immediately after responding to a disk access command from the mobile device, the disk drive is in a first operating mode that consumes a relatively high level of power and may transition to a second operating mode that consumes a relatively low level of power, the disk drive comprising:

means for setting first and second time period thresholds, the first time period threshold being less than the second time period threshold;

means for providing an adjustable delay time interval that is set to correspond to one of the time period thresholds, the delay time interval being the time interval for waiting after an end of a response to a disk access command before transitioning from the first operating mode to the second operating mode;

means for measuring a demand time interval for each of a plurality of disk access commands, wherein each demand time interval is defined as a time period between an end of a response to a last disk access command and an arrival of a next disk access command;

means for setting the delay time interval to be equal to about the first time period threshold if a majority of a predetermined number of the plurality of demand time intervals falls within a time period less than the first time period threshold or a time period greater than the second time period threshold, and setting the delay time interval to be equal to about the second time period threshold if a majority of a predetermined number of the plurality of demand time intervals falls within a time period between the first time period threshold and the second time period threshold; and means for transitioning the disk drive from the first operating mode to the second operating mode after expiration of the delay time interval.

16. A mobile device having a disk drive as defined in claim 15, wherein transitioning from the second operating mode to the first operating mode consumes a transition quantity of power, and an exchange time interval is defined as a time period during which power consumed by operating in the first power operating mode is about equal to the transition quantity of power.

17. A mobile device having a disk drive as defined in claim 16, wherein the second time period threshold is less than the exchange time interval.

18. A mobile device having a disk drive as defined in claim 15, wherein the demand time intervals comprising the predetermined number of the plurality of demand time intervals used by the means for setting the delay time interval are measured using the most recent disk access commands.

19. A mobile device having a disk drive as defined in claim 15, wherein the majority for setting the demand time interval to be equal to about the first time period threshold includes at least one demand time interval that falls within the time period greater than the second time period threshold.

20. A mobile device having a disk drive wherein, immediately after responding to a disk access command from the mobile device, the disk drive is in a first operating mode that consumes a relatively high level of power and may transition to a second operating mode that consumes a relatively low level of power, and wherein transitioning from the second operating mode to the first operating mode consumes a transition quantity of power, and an exchange time interval is defined as a time period during which power consumed by operating in the first power operating mode is about equal to the transition quantity of power, the disk drive comprising:

means for setting first and second time period thresholds, the first time period threshold being less than the second time period threshold, wherein the first time period threshold is about 0.3% of the exchange time interval, and the second time period threshold is about 66% of the exchange time interval;

means for providing an adjustable delay time interval that is set to correspond to one of the time period thresholds, the delay time interval being the time interval for waiting after an end of a response to a disk access command before transitioning from the first operating mode to the second operating mode;

means for measuring a demand time interval for each of a plurality of disk access commands, wherein each demand time interval is defined as a time period between an end of a response to a last disk access command and an arrival of a next disk access command;

means for setting the delay time interval to be equal to about the first time period threshold if a majority of a predetermined number of the plurality of demand time intervals falls within a time period less than the first time period threshold or a time period greater than the second time period threshold, and setting the delay time interval to be equal to about the second time period threshold if a majority of a predetermined number of the plurality of demand time intervals falls within a time period between the first time period threshold and the second time period threshold; and means for transitioning the disk drive from the first operating mode to the second operating mode after expiration of the delay time interval.

21. A mobile device having a disk drive wherein, immediately after responding to a disk access command from the mobile device, the disk drive is in a first operating mode that consumes a relatively high level of power and may transition to a second operating mode that consumes a relatively low level of power, the disk drive comprising:

means for setting first and second time period thresholds, the first time period threshold being less than the second time period threshold;

means for providing an adjustable delay time interval that is set to correspond to one of the time period thresholds, the delay time interval being the time interval for waiting after an end of a response to a disk access command before transitioning from the first operating mode to the second operating mode;

means for measuring a demand time interval for each of a plurality of disk access commands, wherein each demand time interval is defined as a time period between an end of a response to a last disk access command and an arrival of a next disk access command;

means for setting the delay time interval to be equal to about the first time period threshold if 4 of 7 of the plurality of demand time intervals falls within a time period less than the first time period threshold or a time period greater than the second time period threshold, and setting the delay time interval to be equal to about the second time period threshold if 4 of 7 of the plurality of demand time intervals falls within a time period between the first time period threshold and the second time period threshold; and means for transitioning the disk drive from the first operating mode to the second operating mode after expiration of the delay time interval.

22. A mobile device having a disk drive wherein, immediately after responding to a disk access command, the disk drive is in first operating mode that consumes a relatively high level of power and may transition to a second operating mode that consumes a relatively low level of power, the disk drive comprising:

means for setting first, second and third time period thresholds, the first time period threshold being less than the second time period threshold and the second time period threshold being less than the third time period threshold;

means for providing an adjustable delay time interval that is set to correspond to one of the time period thresholds, the delay time interval being the time interval for waiting after an end of a response to a disk access command before transitioning from the first operating mode to the second operating mode;

means for measuring a demand time interval for each of a plurality of disk access commands, wherein each demand time interval is defined as a time period between an end of a response to a last disk access command and an arrival of a next disk access command;

means for setting the delay time interval to be equal to about the first time period threshold if a majority of a predetermined number of the plurality of demand time intervals falls within a time period less than the first time period threshold or a time period greater than the third time period threshold, setting the delay time interval to be equal to about the second time period threshold if a majority of a predetermined number of the plurality of demand time intervals falls within a time period between the first time period threshold and the second time period threshold, and setting the delay time interval to be equal to about the third time period threshold if a majority of a predetermined number of the plurality of demand time intervals falls within a time period between the second time period threshold and the third time period threshold; and means for transitioning the disk drive from the first operating mode to the second operating mode after expiration of the delay time interval.

23. A mobile device having a disk drive as defined in claim 22, wherein transitioning from the second operating mode to the first operating mode consumes a transition quantity of power, and an exchange time interval is defined as a time period during which power consumed by operating in the first power operating mode is about equal to the transition quantity of power.

24. A mobile device having a disk drive as defined in claim 23, wherein the third time period threshold is less than the exchange time interval.

25. A mobile device having a disk drive as defined in claim 22, wherein the demand time intervals comprising the predetermined number of the plurality of demand time intervals used by the means for setting the delay time interval are measured using the most recent disk access commands.

26. A mobile device having a disk drive as defined in claim 22, wherein the majority for setting the demand time interval to be equal to about the first time period threshold includes at least one demand time interval that falls within the time period greater than the third time period threshold.

27. A mobile device having a disk drive wherein, immediately after responding to a disk access command, the disk drive is in first operating mode that consumes a relatively high level of power and may transition to a second operating mode that consumes a relatively low level of power, and wherein transitioning from the second operating mode to the first operating mode consumes a transition quantity of power, and an exchange time interval is defined as a time period during which power consumed by operating in the first power operating mode is about equal to the transition quantity of power, the disk drive comprising:

means for setting first, second and third time period thresholds, the first time period threshold being less than the second time period threshold and the second time period threshold being less than the third time period threshold, wherein the first time period threshold is about 0.3% of the exchange time interval, the second time period threshold is about 33% of the exchange time period, and the third time period threshold is about 66% of the exchange time interval;

means for providing an adjustable delay time interval that is set to correspond to one of the time period thresholds, the delay time interval being the time interval for waiting after an end of a response to a disk access command before transitioning from the first operating mode to the second operating mode;

means for measuring a demand time interval for each of a plurality of disk access commands, wherein each demand time interval is defined as a time period between an end of a response to a last disk access command and an arrival of a next disk access command;

means for setting the delay time interval to be equal to about the first time period threshold if a majority of a predetermined number of the plurality of demand time intervals falls within a time period less than the first time period threshold or a time period greater than the third time period threshold, setting the delay time interval to be equal to about the second time period threshold if a majority of a predetermined number of the plurality of demand time intervals falls within a time period between the first time period threshold and the second time period threshold, and setting the delay time interval to be equal to about the third time period threshold if a majority of a predetermined number of the plurality of demand time intervals falls within a time period between the second time period threshold and the third time period threshold; and means for transitioning the disk drive from the first operating mode to the second operating mode after expiration of the delay time interval.

28. A mobile device having a disk drive wherein, immediately after responding to a disk access command, the disk drive is in first operating mode that consumes a relatively high level of power and may transition to a second operating mode that consumes a relatively low level of power, the disk drive comprising:

means for setting first, second and third time period thresholds, the first time period threshold being less than the second time period threshold and the second time period threshold being less than the third time period threshold;

means for providing an adjustable delay time interval that is set to correspond to one of the time period thresholds, the delay time interval being the time interval for waiting after an end of a response to a disk access command before transitioning from the first operating mode to the second operating mode;

means for measuring a demand time interval for each of a plurality of disk access commands, wherein each demand time interval is defined as a time period between an end of a response to a last disk access command and an arrival of a next disk access command;

means for setting the delay time interval to be equal to about the first time period threshold if 4 of 7 of the plurality of demand time intervals falls within a time period less than the first time period threshold or a time period greater than the third time period threshold, setting the delay time interval to be equal to about the second time period threshold if 4 of 7 of the plurality of demand time intervals falls within a time period between the first time period threshold and the second time period threshold, and setting the delay time interval to be equal to about the third time period threshold if 4 of 7 of the plurality of demand time intervals falls within a time period between the second time period threshold and the third time period threshold; and means for transitioning the disk drive from the first operating mode to the second operating mode after expiration of the delay time interval.

29. A disk drive for use in a mobile device wherein, immediately after responding to a disk access command from the mobile device, the disk drive is in a first operating mode that consumes a relatively high level of power and may transition to a second operating mode that consumes a relatively low level of power, the disk drive comprising:

means for setting first and second time period thresholds, the first time period threshold being less than the second time period threshold;

means for providing an adjustable delay time interval that is set to correspond to one of the time period thresholds, the delay time interval being the time interval for waiting after an end of a response to a disk access command before transitioning from the first operating mode to the second operating mode;

means for measuring a demand time interval for each of a plurality of disk access commands, wherein each demand time interval is defined as a time period between an end of a response to a last disk access command and an arrival of a next disk access command;

means for setting the delay time interval to be equal to about the first time period threshold if a majority of a predetermined number of the plurality of demand time intervals falls within a time period less than the first time period threshold or a time period greater than the second time period threshold, and setting the delay time interval to be equal to about the second time period threshold if a majority of a predetermined number of the plurality of demand time intervals falls within a time period between the first time period threshold and the second time period threshold; and means for transitioning the disk drive from the first operating mode to the second operating mode after expiration of the delay time interval.

30. A disk drive as defined in claim 29, wherein transitioning from the second operating mode to the first operating mode consumes a transition quantity of power, and an exchange time interval is defined as a time period during which power consumed by operating in the first power operating mode is about equal to the transition quantity of power.

31. A disk drive as defined in claim 30, wherein the second time period threshold is less than the exchange time interval.

32. A disk drive as defined in claim 29, wherein the demand time intervals comprising the predetermined number of the plurality of demand time intervals used by the means for setting the delay time interval are measured using the most recent disk access commands.

33. A disk drive as defined in claim 29, wherein the majority for setting the demand time interval to be equal to about the first time period threshold includes at least one demand time interval that falls within the time period greater than the second time period threshold.

34. A disk drive wherein, immediately after responding to a disk access command from the mobile device, the disk drive is in a first operating mode that consumes a relatively high level of power and may transition to a second operating mode that consumes a relatively low level of power, wherein transitioning from the second operating mode to the first operating mode consumes a transition quantity of power, and an exchange time interval is defined as a time period during which power consumed by operating in the first power operating mode is about equal to the transition quantity of power, the disk drive comprising:

means for setting first and second time period thresholds, the first time period threshold being less than the second time period threshold, wherein the first time period threshold is about 0.3% of the exchange time interval, and the second time period threshold is about 66% of the exchange time interval;

means for providing an adjustable delay time interval that is set to correspond to one of the time period thresholds, the delay time interval being the time interval for waiting after an end of a response to a disk access command before transitioning from the first operating mode to the second operating mode;

means for measuring a demand time interval for each of a plurality of disk access commands, wherein each demand time interval is defined as a time period between an end of a response to a last disk access command and an arrival of a next disk access command;

means for setting the delay time interval to be equal to about the first time period threshold if a majority of a predetermined number of the plurality of demand time intervals falls within a time period less than the first time period threshold or a time period greater than the second time period threshold, and setting the delay time interval to be equal to about the second time period threshold if a majority of a predetermined number of the plurality of demand time intervals falls within a time period between the first time period threshold and the second time period threshold; and means for transitioning the disk drive from the first operating mode to the second operating mode after expiration of the delay time interval.

35. A disk drive wherein, immediately after responding to a disk access command from the mobile device, the disk drive is in a first operating mode that consumes a relatively high level of power and may transition to a second operating mode that consumes a relatively low level of power, the disk drive comprising:

means for setting first and second time period thresholds, the first time period threshold being less than the second time period threshold;

means for providing an adjustable delay time interval that is set to correspond to one of the time period thresholds, the delay time interval being the time interval for waiting after an end of a response to a disk access command before transitioning from the first operating mode to the second operating mode;

means for measuring a demand time interval for each of a plurality of disk access commands, wherein each demand time interval is defined as a time period between an end of a response to a last disk access command and an arrival of a next disk access command;

means for setting the delay time interval to be equal to about the first time period threshold if a majority of a predetermined number of the plurality of demand time intervals falls within a time period less than the first time period threshold or a time period greater than the second time period threshold, and setting the delay time interval to be equal to about the second time period threshold if a majority of a predetermined number of the plurality of demand time intervals falls within a time period between the first time period threshold and the second time period threshold; and means for transitioning the disk drive from the first operating mode to the second operating mode after expiration of the delay time interval.

36. A disk drive for use in a mobile device wherein, immediately after responding to a disk access command, the disk drive is in first operating mode that consumes a relatively high level of power and may transition to a second operating mode that consumes a relatively low level of power, the disk drive comprising:

means for setting first, second and third time period thresholds, the first time period threshold being less than the second time period threshold and the second time period threshold being less than the third time period threshold;

means for providing an adjustable delay time interval that is set to correspond to one of the time period thresholds, the delay time interval being the time interval for waiting after an end of a response to a disk access command before transitioning from the first operating mode to the second operating mode;

means for measuring a demand time interval for each of a plurality of disk access commands, wherein each demand time interval is defined as a time period between an end of a response to a last disk access command and an arrival of a next disk access command;

means for setting the delay time interval to be equal to about the first time period threshold if a majority of a predetermined number of the plurality of demand time intervals falls within a time period less than the first time period threshold or a time period greater than the third time period threshold, setting the delay time interval to be equal to about the second time period threshold if a majority of a predetermined number of the plurality of demand time intervals falls within a time period between the first time period threshold and the second time period threshold, and setting the delay time interval to be equal to about the third time period threshold if a majority of a predetermined number of the plurality of demand time intervals falls within a time period between the second time period threshold and the third time period threshold; and means for transitioning the disk drive from the first operating mode to the second operating mode after expiration of the delay time interval.

37. A disk drive as defined in claim 36, wherein transitioning from the second operating mode to the first operating mode consumes a transition quantity of power, and an exchange time interval is defined as a time period during which power consumed by operating in the first power operating mode is about equal to the transition quantity of power.

38. A disk drive as defined in claim 37, wherein the third time period threshold is less than the exchange time interval.

39. A disk drive as defined in claim 36, wherein the demand time intervals comprising the predetermined number of the plurality of demand time intervals used by the means for setting the delay time interval are measured using the most recent disk access commands.

40. A disk drive as defined in claim 36, wherein the majority for setting the demand time interval to be equal to about the first time period threshold includes at least one demand time interval that falls within the time period greater than the third time period threshold.

41. A disk drive wherein, immediately after responding to a disk access command, the disk drive is in first operating mode that consumes a relatively high level of power and may transition to a second operating mode that consumes a relatively low level of power, and wherein transitioning from the second operating mode to the first operating mode consumes a transition quantity of power, and an exchange time interval is defined as a time period during which power consumed by operating in the first power operating mode is about equal to the transition quantity of power, the disk drive comprising:

means for setting first, second and third time period thresholds, the first time period threshold being less than the second time period threshold and the second time period threshold being less than the third time period threshold, wherein the first time period threshold is about 0.3% of the exchange time interval, the second time period threshold is about 33% of the exchange time period, and the third time period threshold is about 66% of the exchange time interval;

means for providing an adjustable delay time interval that is set to correspond to one of the time period thresholds, the delay time interval being the time interval for waiting after an end of a response to a disk access command before transitioning from the first operating mode to the second operating mode;

means for measuring a demand time interval for each of a plurality of disk access commands, wherein each demand time interval is defined as a time period between an end of a response to a last disk access command and an arrival of a next disk access command;

means for setting the delay time interval to be equal to about the first time period threshold if a majority of a predetermined number of the plurality of demand time intervals falls within a time period less than the first time period threshold or a time period greater than the third time period threshold, setting the delay time interval to be equal to about the second time period threshold if a majority of a predetermined number of the plurality of demand time intervals falls within a time period between the first time period threshold and the second time period threshold, and setting the delay time interval to be equal to about the third time period threshold if a majority of a predetermined number of the plurality of demand time intervals falls within a time period between the second time period threshold and the third time period threshold; and means for transitioning the disk drive from the first operating mode to the second operating mode after expiration of the delay time interval.

42. A disk drive wherein, immediately after responding to a disk access command, the disk drive is in first operating mode that consumes a relatively high level of power and may transition to a second operating mode that consumes a relatively low level of power, the disk drive comprising:

means for setting first, second and third time period thresholds, the first time period threshold being less than the second time period threshold and the second time period threshold being less than the third time period threshold;

means for providing an adjustable delay time interval that is set to correspond to one of the time period thresholds, the delay time interval being the time interval for waiting after an end of a response to a disk access command before transitioning from the first operating mode to the second operating mode;

means for measuring a demand time interval for each of a plurality of disk access commands, wherein each demand time interval is defined as a time period between an end of a response to a last disk access command and an arrival of a next disk access command;

means for setting the delay time interval to be equal to about the first time period threshold if 4 of 7 of the plurality of demand time intervals falls within a time period less than the first time period threshold or a time period greater than the third time period threshold, setting the delay time interval to be equal to about the second time period threshold if 4 of 7 of the plurality of demand time intervals falls within a time period between the first time period threshold and the second time period threshold, and setting the delay time interval to be equal to about the third time period threshold if 4 of 7 of the plurality of demand time intervals falls within a time period between the second time period threshold and the third time period threshold; and means for transitioning the disk drive from the first operating mode to the second operating mode after expiration of the delay time interval.

* * * * *